(12) United States Patent
Doursoux et al.

(10) Patent No.: US 12,194,940 B2
(45) Date of Patent: Jan. 14, 2025

(54) VEHICLE STEERING WHEEL

(71) Applicant: Autoliv Development AB, Vargarda (SE)

(72) Inventors: Hugues Doursoux, Latillé (FR);
Mickael Peyrot, Latillé (FR); Thierry Matrat, Vouille (FR); Thomas Letierce, Vouneuil (FR); Sylvain Perrault, Chiré-en-Montreuil (FR); Fabrice Moinard, Vouzailles (FR); Olivier Bertrand, Courcome (FR); Marcus Weber, Untertheres (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/564,434

(22) PCT Filed: May 20, 2022

(86) PCT No.: PCT/EP2022/063676
§ 371 (c)(1),
(2) Date: Nov. 27, 2023

(87) PCT Pub. No.: WO2022/248346
PCT Pub. Date: Dec. 1, 2022

(65) Prior Publication Data
US 2024/0262309 A1    Aug. 8, 2024

(30) Foreign Application Priority Data

May 27, 2021   (FR) ........................................ 2105510

(51) Int. Cl.
*B60R 21/203* (2006.01)
*B60Q 5/00* (2006.01)

(52) U.S. Cl.
CPC .......... *B60R 21/2037* (2013.01); *B60Q 5/003* (2013.01)

(58) Field of Classification Search
CPC .............. B60R 21/203; B60R 21/2035; B60R 21/2037; B62D 1/04; B60Q 5/003
(Continued)

(56) References Cited

U.S. PATENT DOCUMENTS

2002/0053786 A1\* 5/2002 Paonessa ................ B60Q 5/003
                                                                280/743.1
2011/0089672 A1\* 4/2011 Nebel .................. B60R 21/2037
                                                                280/728.2
(Continued)

FOREIGN PATENT DOCUMENTS

DE   102005055934 A1   5/2007
DE   102013213822 A1 \* 1/2015  ......... B60R 21/2037
(Continued)

*Primary Examiner* — Keith J Frisby
(74) *Attorney, Agent, or Firm* — Matthew D. Thayne; Thayne and Davis LLC

(57) ABSTRACT

The invention relates to a vehicle steering wheel, comprising:
  a framework,
  a safety module comprising a first decorative component,
  a base component,
  at least one centering component, attached and fixed to the base component by an irreversible connection and arranged to position the safety module with respect to the base component,
  at least one second decorative component mounted on the framework,
wherein the irreversible connection is arranged to permit an adjustment of the position of the centering component on the base component before fixing the centering component on the base component, (Continued)

characterized in that the irreversible connection is provided by laser welding of the centering component on the base component.

19 Claims, 6 Drawing Sheets

(58) Field of Classification Search
USPC .............................................. 280/731, 728.2
See application file for complete search history.

(56) References Cited

U.S. PATENT DOCUMENTS

| | | | |
|---|---|---|---|
| 2011/0233905 A1* | 9/2011 | Marotzke | B60Q 5/003 280/731 |
| 2014/0203539 A1* | 7/2014 | Bachmann | B62D 1/046 280/728.1 |
| 2018/0056914 A1* | 3/2018 | Moras | B60R 21/203 |

FOREIGN PATENT DOCUMENTS

| | | |
|---|---|---|
| GB | 2414717 A | 12/2005 |
| WO | 2005/118351 A1 | 12/2005 |

* cited by examiner

[Fig. 1]
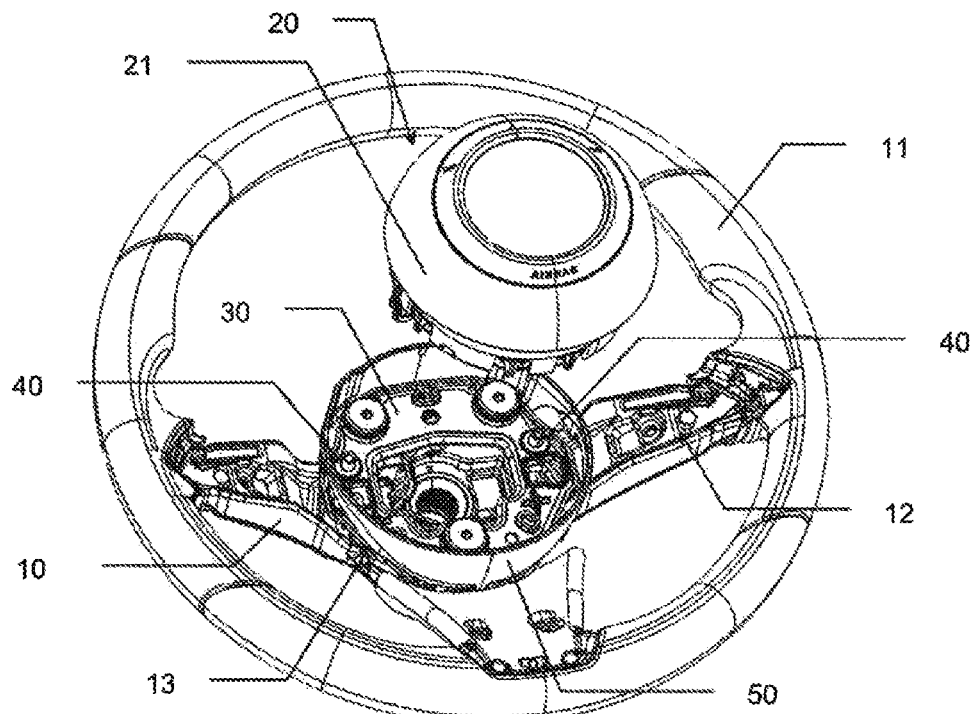
[Fig. 2]
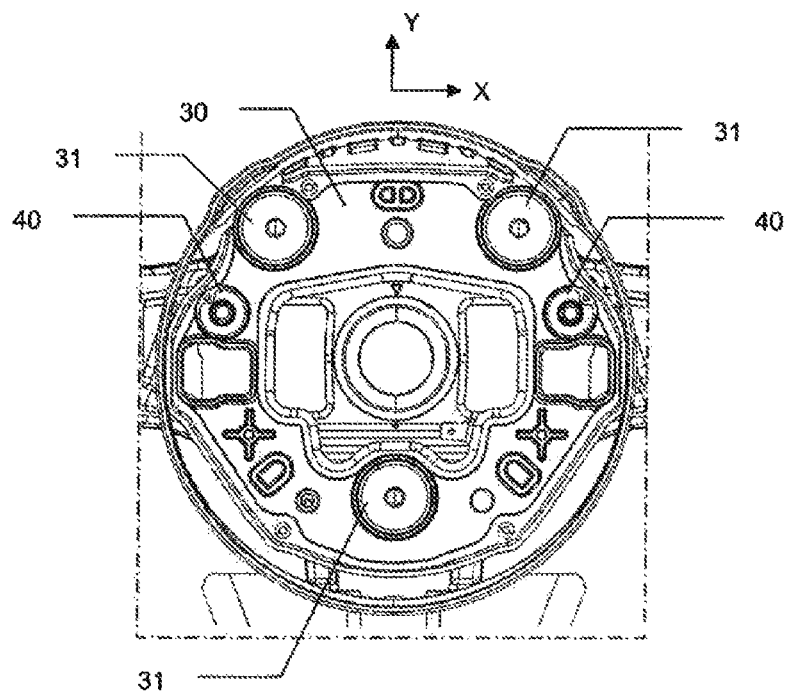

[Fig. 3]
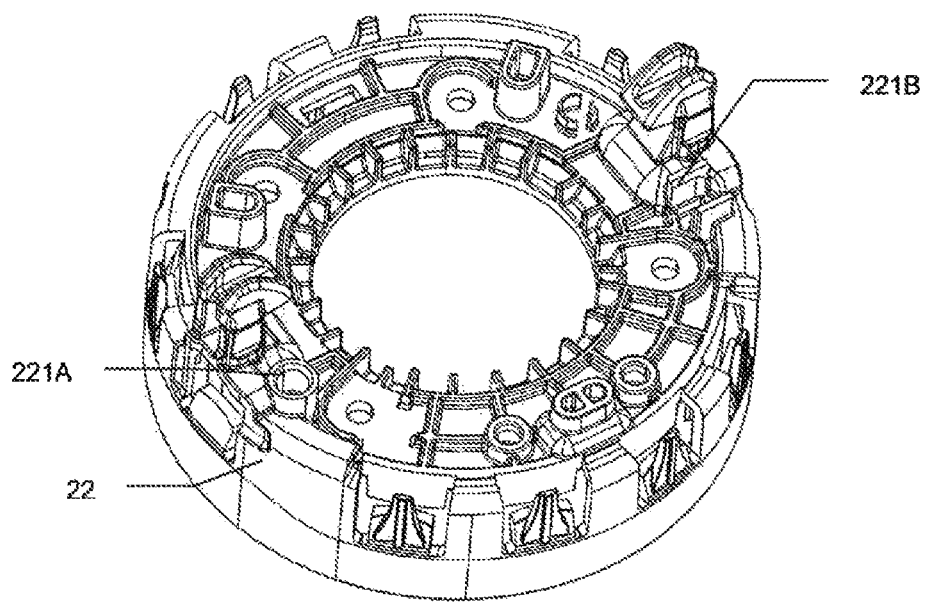
[Fig. 4]
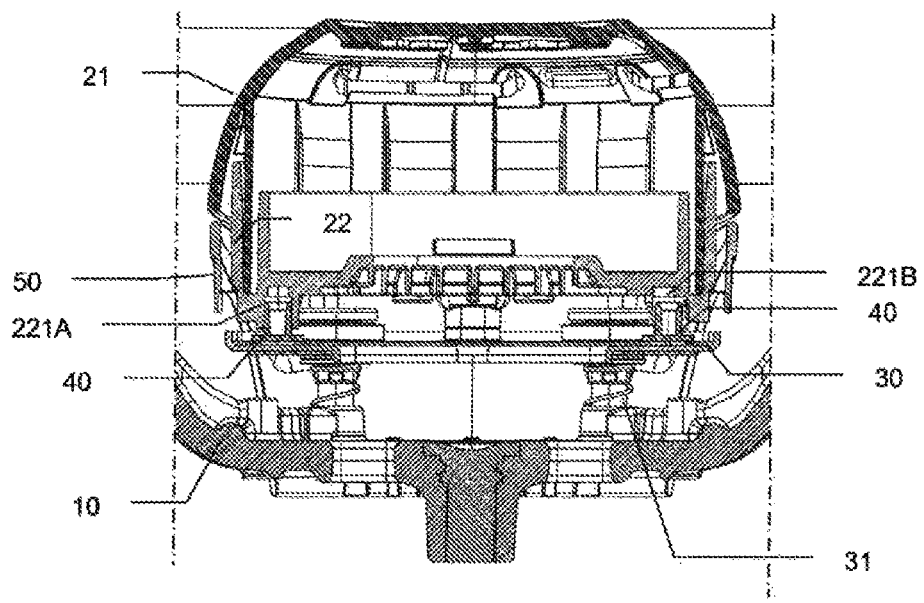

[Fig. 5]
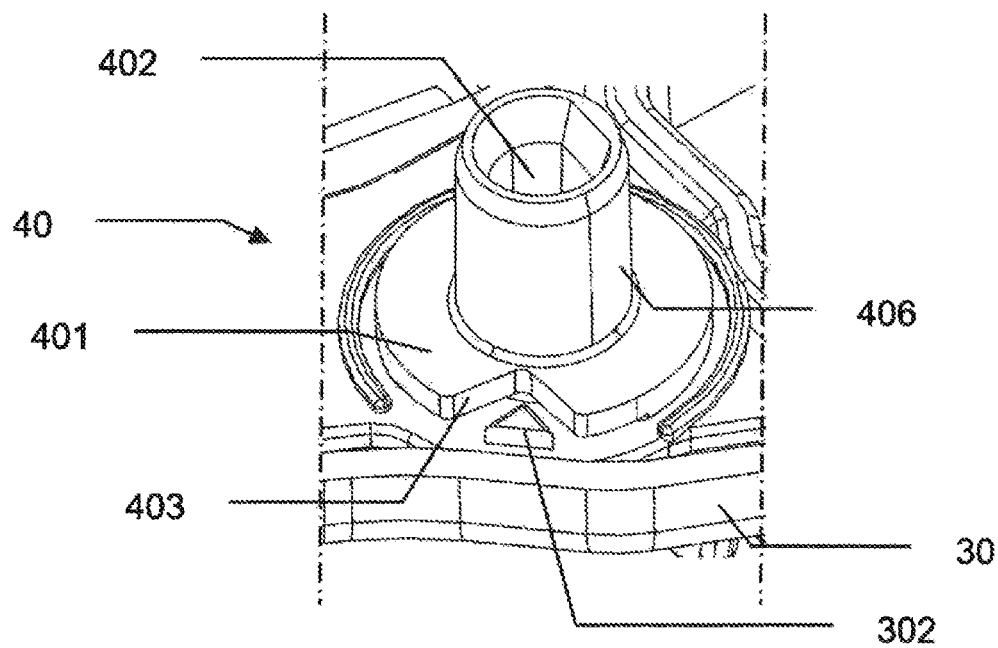
[Fig. 6]
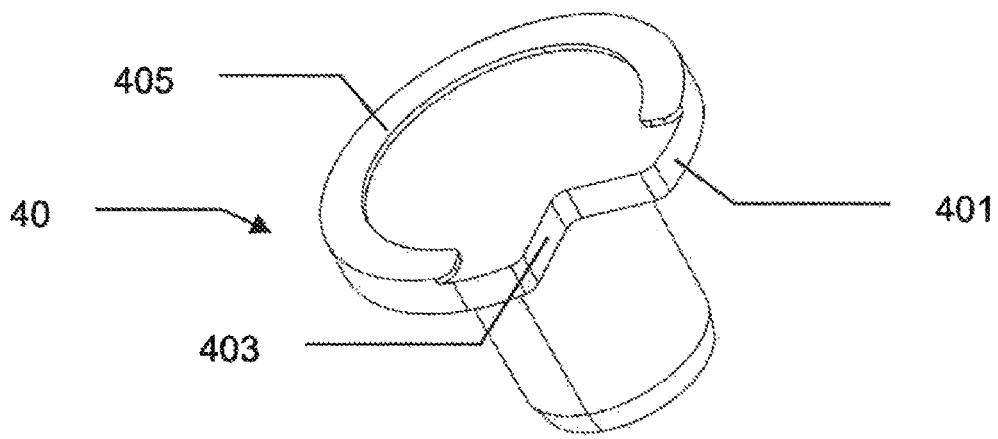

[Fig. 7]
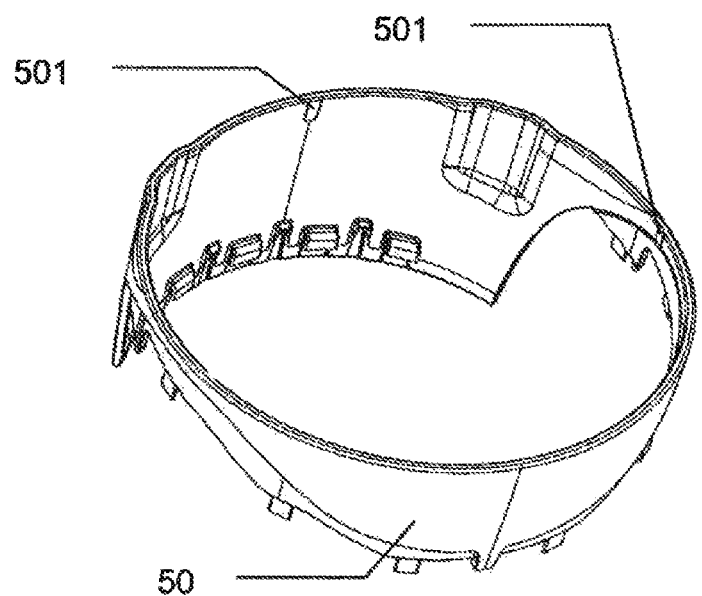
[Fig. 8]
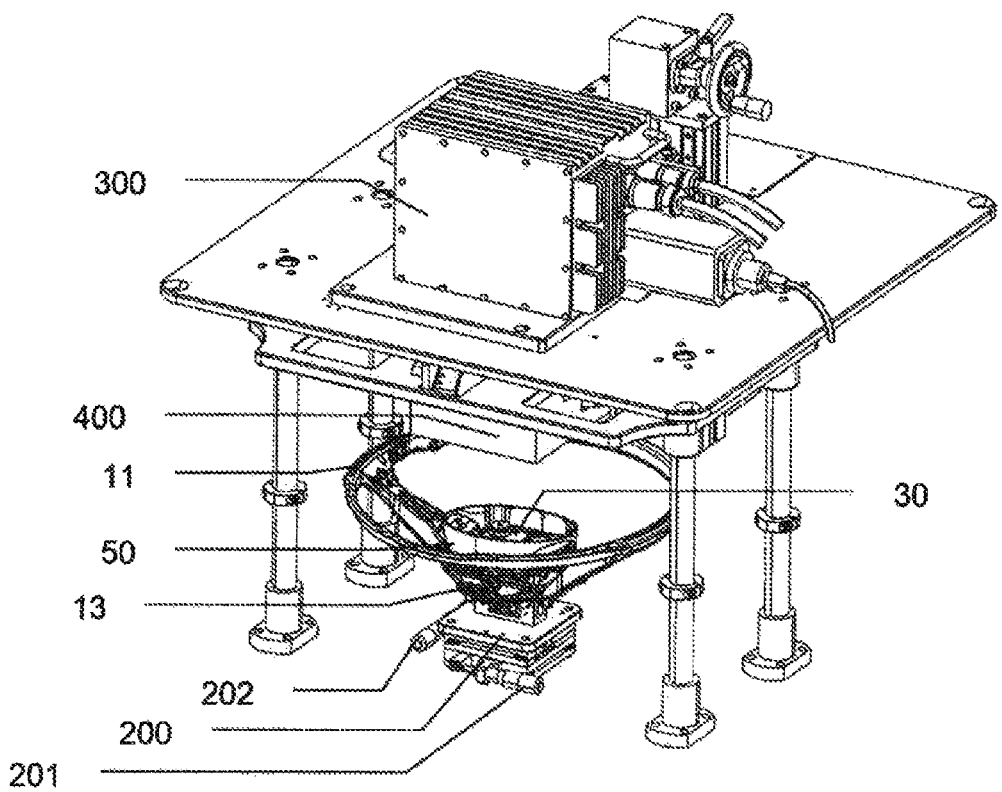

[Fig. 9]
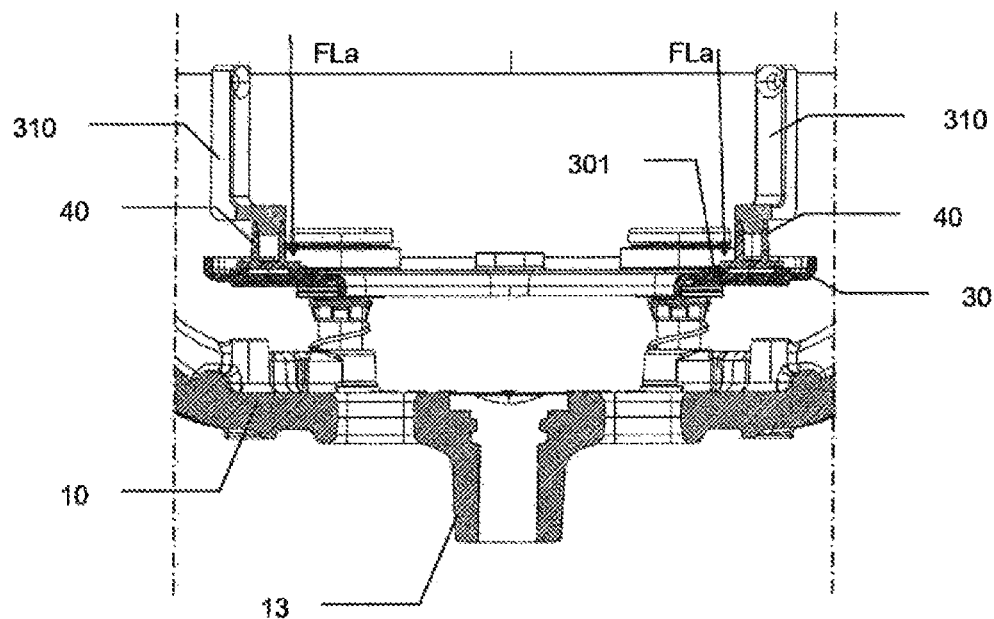
[Fig. 10]
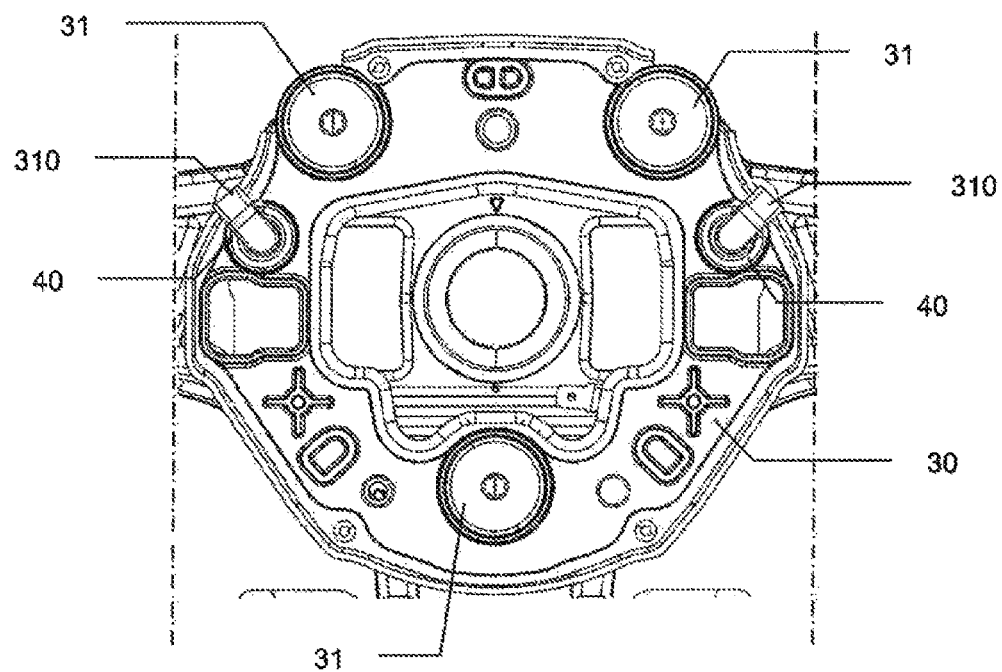

[Fig. 11]
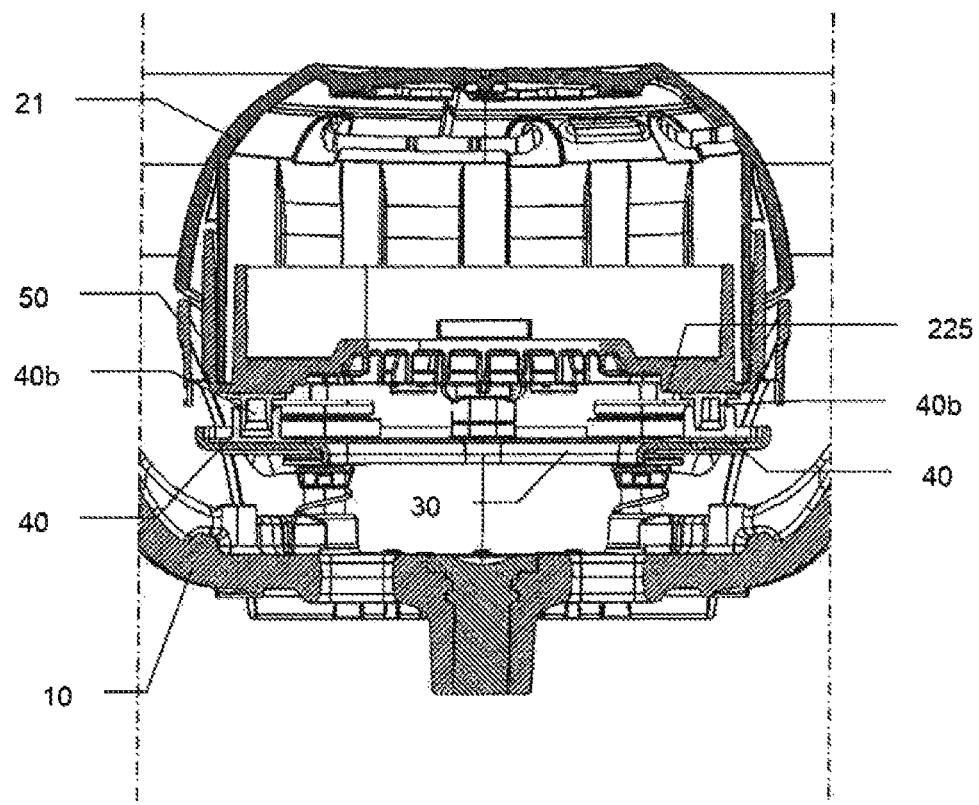

VEHICLE STEERING WHEEL

TECHNICAL FIELD OF THE INVENTION

The present invention generally relates to a motor vehicle steering wheel, and in particular a steering wheel equipped with a safety module (otherwise called airbag) and decorative components visible to a user.

STATE OF THE ART

Document GB2414717A in the prior art for vehicle steering wheels discloses a method for assembling steering wheels comprising measurement and refining steps for improving the symmetry, clearances or fittings between various decorative components. On the other hand, this system may have the disadvantage of being complicated to implement, and of not ensuring that the adjustment is robust due to possible misadjustments over time.

DISCLOSURE OF THE INVENTION

One aim of the present invention is to address the disadvantages of the prior art mentioned above and in particular, first of all, to propose a vehicle steering wheel comprising decorative components and a safety module, which is simple to manufacture and whose symmetry, clearances or fittings between various decorative components are controlled reliably and robustly. Another aspect may be to propose a method for manufacturing such a steering wheel with adjustment or control of simpler or more modular manufacturing clearances.

A first aspect of the invention therefore relates to a vehicle steering wheel comprising:
- a framework,
- a safety module comprising a first decorative component arranged to be visible by a user,
- a base component integral with the framework,
- at least one centering component, attached and fixed to the base component and/or to the safety module by an irreversible connection and arranged to position the safety module with respect to the base component,
- at least one second decorative component mounted on the framework and arranged to be visible by a user, wherein the irreversible connection is arranged to permit an adjustment of the position of the centering component on the base component and/or on the safety module before fixing the centering component on the base component and/or on the safety module, so as to position the first decorative component with respect to the second decorative component, characterized in that the irreversible connection is provided by laser welding of the centering component on the base component and/or on the safety module. Such laser welding has the advantage of not requiring bulky fittings or tools, which offers the possibility of requiring less space. Furthermore, such laser welding offers the possibility of correctly and irreversibly positioning the centering component on the base component and/or on the safety module. For example, a laser weld does not require vibrating or moving the parts relative to one another as for ultrasonic welding, which limits the tolerances on the finished parts.

Finally, welding the centering component on the base component and/or on the safety module makes it possible to improve manufacturing modularity and the possibilities of adjusting the clearances. Indeed, an adjustment operation can be carried out by welding the centering components to the base component (typically in the manufacturing plant of the base component or steering wheel) according to the above implementation and/or by welding the centering components to the safety module (typically in the manufacturing plant of the safety module). According to one embodiment, the operation of adjusting the clearances is carried out with a positioning template or tool, which avoids having to mount the complete steering wheel. It will be understood that the adjustment or control of clearances can be carried out or distributed at several times or locations during the manufacture of the elements composing the steering wheel; when manufacturing the base component, and/or the safety module, and/or the steering wheel.

It is understood that each decorative component is arranged to be at least partially visible by the user (portions are necessarily invisible, hidden, or covered with other components).

According to one embodiment, the base component is a component without any possibility of movement relative to the framework. Typically, mention may be made of a component over-molded onto the framework, welded to the framework or screwed, fixedly clipped or inserted.

According to one embodiment, the base component or the safety module is a component movable relative to the framework. It is typically possible to mention a component that is attached, articulated, in a sliding connection, which can be removed or not.

According to one embodiment, the laser welding of the centering component to the base component and/or to the safety module can form a welded portion that is discrete or which extends along an open curve. It can be noted that an open curve means that the junction zone between the centering component and the base component forms or follows a trajectory that is not closed. It is possible to provide a zone welded in a quarter circle, over a segment, in horseshoe shape, in the form of any curved line, etc. The term discrete welded portions means a welded portion which comprises several separate points or parts. A welded zone formed by dotted lines or segments or successive line portions can be provided. In combination with a laser weld, it may be noted that even if the welded portion is asymmetric or offset or off-center relative to the general shape of either the base component or the safety module or the centering component, such a welded portion that is discrete or that follows an open curve will not generate any crooked or off-axis displacement during the welding (in other words, the penetration or the consumption of material will be homogeneous over the entire welded zone). Furthermore, the non-welded zones (between the discrete zones or between the ends of the open curve) make it possible to provide tooling that would be arranged on the same side of the component as the laser welding source. The welding interruptions are opposite the parts of the tool, so as to bypass it.

According to one embodiment, the invention may relate to a vehicle steering wheel, comprising:
- a framework,
- a safety module comprising a first decorative component arranged to be visible by a user,
- a base component integral with the framework,
- at least one centering component, attached and fixed to the base component and/or to the safety module by an irreversible connection and arranged to position the safety module with respect to the base component,
- at least one second decorative component mounted on the framework and arranged to be visible by a user, wherein the irreversible connection is arranged to permit an adjustment of the position of the centering component on the base component and/or on the safety module before fixing the centering component on the base component and/or on the safety module, so as to position the first decorative component with respect to the second decorative component, characterized in that the irreversible connection is provided by a weld of the centering component on the base component and/or on the safety module in order to form a welded portion that extends along an open curve.

According to one embodiment, the open curve may be an arc of a circle which extends over an angular sector of more than 180°, and preferably over an angular sector of between 200° and 290°. Such an angular sector makes it possible to properly weld the components together, while leaving sufficient space for the passage of a tool through which the laser welding beam cannot pass.

According to one embodiment, either:
the centering component or
the base component or the safety module,
may comprise, for example, at least before welding, at least one stepped or thinned zone forming part of the welded portion. Such a stepped or thinned zone makes it possible to pinpoint the supply of heat and to guarantee a rapid rise in temperature in order to cause the material to be substantially melted or softened. It is typically possible to provide a flange or a rib of material. The component comprising the stepped or thinned zone can advantageously be the component on which the welding work is applied. The laser beam is arranged to heat the plane on which it is focused, which in practice is the plane in which the flange is placed. The flange will melt as the centering component sinks.

According to one embodiment, the centering component may comprise:
a first fitting interface arranged to cooperate and provide an orientation with a welding tool,
a second fitting interface arranged to cooperate and provide a positioning and/or guide connection with the safety module or the base component.

According to one embodiment:
the first fitting interface may comprise a first impression and/or a first protrusion to cooperate and provide an orientation with a welding tool,
the second fitting interface may comprise a second impression and/or a second protrusion to cooperate and provide a positioning and/or guide connection with the safety module or the base component. Thus, the tool provides a desired orientation to the centering component, which can be welded correctly, and then serve to precisely position the base component relative to the safety module.

According to one embodiment, at least either:
the centering component,
or the base component or the safety module,
can be a plastic, preferably thermoplastic, component.

According to one embodiment, the centering component may be made of plastic, such as polyamide, with at least one portion free of filler material, arranged to be passed through by a laser beam during the operation of attaching the centering component to the base component. Typically, the portion free of filler material may have a thickness in a range from 1 mm to 6 mm, and preferably from 2 mm to 4 mm.

According to one embodiment, the base component and/or the safety module may comprise a centering portion made of plastic material, such as polyamide, preferably with a filler material such as glass fibers at about 30% by weight, intended for receiving the centering component.

According to one embodiment, the base component and/or the safety module may comprise a metal core overmolded with plastic material.

According to one embodiment, the base component and/or the safety module can be mounted in a sliding connection with respect to the framework. The sliding connection can be used to actuate the horn. In this embodiment, the welding of the centering components makes it possible to compensate for the clearances necessary for the sliding.

According to one embodiment, the vehicle steering wheel may comprise two centering components each arranged to engage with the safety module or the base component along a translational degree of freedom Z, with:
a first centering component arranged to block two degrees of freedom in translation X and Y,
a second centering component arranged to block a single degree of freedom in translation Y. The module is then perfectly positioned in X and Y.

According to one embodiment, the two centering components can be identical. This makes it possible to limit the diversity of references and the risks of mixing or inversion.

According to one embodiment, the framework and/or preferably the second decorative component may comprise at least one reference point (or a reference portion) arranged to allow an optical measurement for detecting a reference position before performing the adjustment of the position of the centering component on the base component and/or on the safety module before the attachment of the centering component to the base component and/or to the safety module. A particular relief, protrusion, recess, flat, or a pattern can be provided that will be easily detected by an optical sensor to take or recognize a position and thus reposition the base component or the safety module or the centering component on the base component and/or on the safety module before welding. In other words, the welding position of the centering component is determined as a function of the position of the second decorative component, and not as a function of the position of the base component and/or of the safety module.

According to one embodiment, the centering component may comprise a portion such as a shoulder, arranged to be passed through by a laser beam during the laser welding, and wherein said portion has a thickness in a range from 1 mm to 6 mm, and preferably from 2 mm to 4 mm.

According to one embodiment, the base component can support or carry the safety module.

A second aspect of the invention relates to a motor vehicle comprising a vehicle steering wheel according to the first aspect.

A third aspect of the invention relates to a method for manufacturing a vehicle steering wheel according to the first aspect, comprising an operation of laser welding the centering component onto the base component and/or onto the safety module after the adjustment of the position of the centering component on the base component and/or on the safety module.

According to one embodiment, the manufacturing method may comprise a step of positioning the centering component in a welding tool, and wherein the laser welding operation comprises a bypass or a step of bypassing at least part of the welding tool.

According to one embodiment, the manufacturing method may comprise the steps of:
placing the centering component so that it is seated on the base component,
passing a laser beam over the zone to be welded, depressing the centering component toward or into the base component to force a displacement of at least 0.1 mm and preferably of at least 0.2 mm.

DESCRIPTION OF THE FIGURES

Other features and advantages of the present invention will become more apparent upon reading the following detailed description of an embodiment of the invention, which is provided by way of example but in no manner limited thereto, and illustrated by the attached drawings, in which:

FIG. 1 shows an exploded view in perspective of a steering wheel according to the invention, comprising a framework, a safety module with a first decorative component, and a base component surrounded by a second decorative component;

FIG. 2 shows a top view of the base component of the steering wheel of FIG. 1;

FIG. 3 shows a bottom view in perspective of a portion of the safety module of the steering wheel housing of FIG. 1;

FIG. 4 shows a sectional view of the steering wheel of FIG. 1, with the safety module mounted on the base component;

FIG. 5 shows a centering component of the safety module, attached to the base component;

FIG. 6 shows a perspective view of the centering component of FIG. 5 before it is attached to the base component;

FIG. 7 shows a perspective view of the second decorative component;

FIG. 8 shows a welding machine, used to attach the centering component to the base component;

FIG. 9 shows a cross-section of a tool of the welding machine of FIG. 8 receiving the centering component and the base component;

FIG. 10 shows a top view of the tool of FIG. 9;

FIG. 11 shows a cross-section view of an alternative of the steering wheel of FIG. 1.

DETAILED DESCRIPTION OF EMBODIMENT(S)

FIG. 1 shows a steering wheel with a framework 10 that forms a casing or a skeleton for a rim 11, a hub 13 and spokes 12. The steering wheel comprises a safety module 20 or airbag that comprises a first decorative component 21, visible for an occupant of the vehicle equipped with the steering wheel in question. The steering wheel also comprises a base component 30, mounted on the framework 10, and surrounded by a second decorative component 50 anchored or mounted stationary on the framework 10, also visible to the occupant of the vehicle.

The framework 10 is made of metal material (for example, injected magnesium) and comprises at certain locations an overmolding of plastic material (polyurethane for example). However, other materials and embodiments are possible.

Conventionally, the safety module 20 is attached to the base component 30 via an elastic ring, not shown, secured to either the safety module or the base component 30 which engages with a hook (or several hooks) secured to the other of the safety module or the base component 30.

As can be seen in FIG. 2 or 4, the base component 30 is a plate that is movably mounted on the framework 10, according to a sliding connection provided by collar screws 31 screwed into the framework 10 (the safety module is movable to ensure control of the horn). However, the base component 30 could be stationary relative to the armature (a foam can be provided, a part added and attached to it, etc.). The base component 30 comprises a metal casing (a stamped sheet) and overmolded portions 301 made of plastic and visible in FIG. 9. Provision may be made for the overmolded portions 301, for example a thermoplastic such as polyamide, optionally with reinforcing fibers.

In order to perfectly center and position the safety module 20 on the steering wheel and as shown in FIGS. 1 and 2, centering components 40 are provided on the base component 30 to guarantee positioning along X-Y axes of FIG. 2. Indeed, in order to propose a good perceived quality, the first decorative component 21 must be perfectly centered for example on the second decorative component 50.

As can be seen in FIG. 3, which shows a bottom view of the housing 22 of the safety module 20, female recesses 221A and 222B are provided to engage with the centering components 40. The female recess 221A is a bore and will block translation along both the X and Y axes of the drawing of FIG. 2, and the female recess 221B will for its part block only the degree of freedom in translation Y in the drawing of FIG. 2. The translation in Z remains possible to allow assembly/disassembly of the safety module 20 on the steering wheel.

FIG. 4 shows the steering wheel in cross section, with in particular the base component 30 mounted on the framework 10 via the collar screws 31, and the female recesses 221A, 221B are engaged with the centering components 40 in order to position the first decorative component 21 (carried by the housing 22) in a manner centered on the second decorative component 50.

As shown in FIGS. 5 and 6, the centering components 40 are generally stud shaped, with a base 401 from which a shaft 406 extends with a bore 402. A notch 403 is provided in the base 401, to align with a guide 302 of the base component 30. In FIG. 6, the presence can be noted of a peripheral flange 405 that extends over an arc of circle of about 270°. The centering components 40 are made of plastic, and provision may in particular be made for the base 401 to be free of filler material. It is possible to provide for example a thermoplastic such as polyamide.

The second decorative component 50 is shown in FIG. 7 and is in the form of a circular shell. Flats 501 are provided on the inner surface, not visible by the occupant of the vehicle, to allow an optical measurement during manufacturing as will be explained below. Two flats 501 are visible, but it is possible to provide at least three for good optical localization.

With the aim of procuring good adjustment with regular and uniform clearances, in particular between the first decorative component 21 and the second decorative component 50, it is provided to attach the centering components 40 on the base component taking into account the relative position of the second decorative component 50.

According to one embodiment, it is proposed to attach the centering components 40 by laser welding onto the base component. Indeed, a laser weld provides greater positioning precision for example than ultrasound welding, in particular due to the absence of vibrations. In addition, the tools required for laser welding are more compact, which leaves more freedom as to the positioning and dimensions of the centering components 40.

FIG. 8 shows a welding machine for attaching the centering components 40 to the base component 30. A laser source 300 is provided in the upper part, the steering wheel is positioned on a pallet 200 under the table that carries the laser source 300, and an optical detection module 400 is provided above the steering wheel.

Once the steering wheel is equipped with the base component 30 and the second decorative component 50, it is positioned in the welding machine as shown in FIG. 8 and the optical detection module 400 can then measure the position of the flats 501 of the second decorative component 50 in order to determine the location in X and Y (with reference to FIG. 2).

Once the position of the second decorative component 50 is known, it is possible to reposition the steering wheel in X and Y relative to the chassis of the welding machine, by means of stepping motors 201 and 202 on board the pallet 200. Provision could be made to move the laser source as well as the centering components 40, as a more complicated alternative for implementation.

As shown in FIG. 9, jigs 310 carrying the centering components 40 can then be lowered to contact the centering components 40 on the base component 30 in order to attach them by laser welding. Indeed, the measurement of position via the flats 501 and the repositioning of the steering wheel before the lowering of the jigs 310 makes it possible to guarantee that the centering components 40 have a position on the base component 30 which compensates for any variation in positioning of the second decorative component 50 relative to the framework 10 and to the base component 30.

It is then possible to perform laser welding via a laser beam FLa, through the base 401 which is specifically free of filler material, the material of which is chosen to be able to be passed through by the laser beam, and which comprises on its lower face the peripheral flange 405 which preferentially will quickly melt or soften. A vertical axial force oriented downward in FIG. 9 can be applied to the jigs 310 in order to properly press the centering components 40 onto the base component 30 and to force a depression of at least 0.1 mm or 0.2 mm. The measurement of such a depression (during or after the weld) makes it possible to verify that the weld is made correctly. As explained below, the depression cannot exceed the height of the flange 405, due to the central surface of the base 401 which would prevent the centering components 40 from penetrating too far into the base component 30.

FIG. 10 shows the welding tool seen from above with the jigs 310 that carry the centering components 40. Due to the presence of the jigs 310, it is proposed to perform the laser welding only on an arc of a circle, to avoid any reworking operation that can induce positioning defects or losses in manufacturing time. Indeed, the laser beam FLa cannot pass through the jigs 310. However, a laser weld forming a welded zone that follows an open curve makes it possible to suitably attach the centering components 40 onto the base component 30.

Indeed, even if the welded portion has interruptions or follows an open curve in order to avoid, for example, the jigs 310, the axial depression requires less force than an ultrasound weld for example, and does not generate any parasitic movement (tilting, sliding along X or Y, rotation along X or Y).

In the example given, the welded portion will be substantially formed along the peripheral flange 405 having a weld, that is, along an arc of a circle of about 270°. However, other shapes are possible: horseshoe, succession of segments, curve portions, any curve, etc.

It may also be noted that the height of the flange 405 ensures that the heating of the material caused by the path of the laser beam FLa will be located at this spot, but that the height of the flange is limited to, for example, less than 0.5 mm, so as to guarantee that the rest of the lower face of the centering components 40 comes into contact with the base component 30 in order to limit the depression of the centering component 40, even in the event of a high rise in temperature. In addition, this makes it possible to guarantee the absence of tilting and that the shaft 406 is properly perpendicular to the base component 30.

The notches 403 can make it possible to place the base components 40 with the correct orientation in the welding tool and also to form a visual marker once the part has been finished, since they are opposite the mark 302 of the base component 30 (FIG. 5).

It is also possible to provide a keying index in the welding tool that guarantees that the notches 403 are in the correct place. A flat in the bore 402 may also be noted in FIG. 5, which can also provide an angular orientation during assembly in the welding tool.

The laser welding between the two plastic parts (the centering component 40 and the overmolded portion 301 of the base component 30) makes it possible to form a welded portion with a significant temperature rise in order to generate an area where the two parts are melted or quasi-melted. Thus, by applying a small axial force, the two parts are brought closer to one another (between 0.1 mm and 0.5 mm), which causes an interpenetration and mixing of the materials. Such a weld, carried out through the thickness of the base 401 of the centering component, makes it possible to ensure high positioning precision, since the axial thrust force is limited (compared to ultrasound welding for example).

In addition, the jigs 310 only have a function of locating and applying a limited thrust force, which makes it possible to provide them with small dimensions, which makes it possible to provide a passage of small dimensions and to free space for other components of the steering wheel.

As a result, since the welding of the centering components 40 is carried out after repositioning the steering wheel, the dimensional variations of positioning of the base component 30 are compensated, and an accurate adjustment can be guaranteed between the first decorative component 21 of the safety module 20 and the second decorative component 50 previously attached to the framework 10.

It should be noted that the base component 30 is here movable on the framework 10, but it is possible to weld the centering components directly onto an overmolding or a plastic part that is stationary relative to the framework, in the case where it is not necessary to have a movable base component, for example in the case where the steering wheel is equipped with a normally closed horn system positioned between the safety module and the framework.

The first decorative component, like the second decorative component, may have shapes that are entirely different from those of the given example. It may involve, for example, overmolded parts, metal parts, etc.

Preferably, the plastic materials of both components (the centering component 40 and the base component 30) welded by laser are thermoplastic, but a single thermoplastic component can be provided. The second component may be metallic, or even made of thermosetting plastic for example.

FIG. 11 shows an alternative configuration of the steering wheel of FIG. 1, in particular compared to the cross-section of FIG. 4. According to this alternative, it can be noted that centering components 40b are provided at the safety module 20, in order to engage with centering components 40 coupled to the base component 30.

The centering components 40 are welded to the base component 30 (as an alternative, they can be overmolded on the base component 30), and the centering components 40*b* are welded to the safety module 20 on a lower surface 225 thereof. It is possible to provide the same type of weld as the one described above with reference to FIGS. 8 and 9. In particular, it is possible to provide the same interfaces (shown in FIGS. 5 and 6 for example) and weld settings for the centering components 40*b* welded to the safety module 20 as for the centering components 40 welded to the base component 30.

It can be noted in comparison with FIG. 4 that in FIG. 11 the centering components 40*b* welded to the safety module 20 form male parts and that the centering components 40 welded to the base component 30 form a female interface, but it is possible to provide the opposite. However, in any case the structure of FIG. 11 provides the same location architecture as in FIG. 4 where a female housing 221A (a bore), blocks the translations along both the X and Y axes of the plane of FIG. 2, and where a female housing 221B for its part blocks only the degree of freedom in translation Y in the plane of FIG. 2. The translation in Z remains possible to allow assembly/disassembly of the safety module 20 on the steering wheel.

In the same way as for the preceding alternative, the system of FIG. 11 makes it possible to obtain an adjustment of the first decorative component 21 on the safety module 20 with the second decorative component 50 on the framework 10. However, it can be noted that the system of FIG. 11 comprises centering components 40*b* welded to the safety module 20 and centering components 40 welded to the base component 30, which offers two possibilities of adjusting, and/or making up for, and/or compensating for dimensional clearances or tolerances or deviations.

On the one hand, the centering components 40 welded to the base component 30 can be used to compensate for clearances or dimensional tolerances or deviations generated for the parts on or integral with the framework 10. On the other hand, the centering components 40*b* welded to the safety module 20 can be used to compensate for the dimensional clearances or tolerances or deviations generated for the parts on or integral with the safety module 20. Finally, the centering components 40 welded to the base component 30 and the centering components 40*b* welded to the safety module 20 can be used to compensate for the dimensional clearances or tolerances or deviations generated by the assembly of the safety module 20 on the base component 30 or on the framework 10 (a first safety module model 20 may require an assembly on the base component 30 different from a second safety module model 20).

Finally, centering components 40 welded to the base component 30 offer a possibility of making the welding operations on the manufacturing site of the base component 30 (with for example a control template), or on the steering wheel manufacturing site, and centering components 40*b* welded to the safety module 20 offer a possibility of carrying out the welding operations on the manufacturing site of the safety module (with for example a control template). The manufacturing method is more flexible and modular and the opportunities for correcting dimensional variations are improved.

INDUSTRIAL APPLICATION

A vehicle steering wheel according to the present invention, and its manufacture, are capable of industrial application.

It will be understood that various modifications and/or improvements which are obvious to a person skilled in the art may be made to the different embodiments of the invention described in the present description without departing from the scope of the invention.

In particular, it is possible to provide centering components welded to the base component, or to the safety module, or to both these parts, that is to say to the base component and to the safety module. However, and in particular in the latter case, a laser weld can be provided only on part of the added centering components. For example, laser welding of the centering components can be provided only for the parts that are difficult to access.

The invention claimed is:

1. A vehicle steering wheel, comprising:
    a framework,
    a safety module comprising a first decorative component arranged to be visible by a user,
    a base component integral with the framework,
    at least one centering component, attached and fixed to the base component and/or to the safety module by an irreversible connection and arranged to position the safety module with respect to the base component,
    at least one second decorative component mounted on the framework and arranged to be visible by a user,
    wherein the irreversible connection is arranged to permit an adjustment of the position of the centering component on the base component and/or on the safety module before fixing the centering component on the base component and/or on the safety module, so as to position the first decorative component with respect to the second decorative component,
    characterized in that the irreversible connection is provided by laser welding of the centering component on the base component and/or on the safety module.

2. The vehicle steering wheel according to claim 1, wherein the laser welding of the centering component on the base component and/or on the safety module forms a welded portion that is discrete or which extends along an open curve.

3. The vehicle steering wheel according to claim 2, wherein the open curve is an arc of a circle which extends over an angular sector of more than 180°.

4. The vehicle steering wheel according to claim 3, wherein the open curve is an arc of a circle which extends over an angular sector of between 200° and 290°.

5. The vehicle steering wheel according to claim 2, wherein either:
    the centering component,
    or the base component and/or the safety module,
    comprises at least one stepped or thinned zone forming part of the welded portion.

6. The vehicle steering wheel according to claim 1, wherein the centering component comprises:
    a first fitting interface arranged to cooperate and provide an orientation with a welding tool,
    a second fitting interface arranged to cooperate and provide a positioning and/or guide connection with the safety module or the base component.

7. The vehicle steering wheel according to claim 1, wherein either:
    the centering component,
    or the base component and/or the safety module,
    is a plastic.

8. The vehicle steering wheel according to claim 7, wherein the centering component is made of plastic material, such as polyamide, with at least one portion free of filler material arranged to be passed through by a laser beam during the operation of fastening the centering component to the base component and/or to the safety module.

9. The vehicle steering wheel according to claim 7, wherein the base component and/or the safety module comprise a centering portion made of plastic material intended to receive the centering component.

10. The vehicle steering wheel according to claim 9, wherein the centering portion is made of polyamide with a filler material comprising glass fibers at about 30% by weight.

11. The vehicle steering wheel according to claim 1, wherein the base component and/or the safety module comprises a metal core overmolded with plastic material.

12. The vehicle steering wheel according to claim 1, comprising two centering components each arranged to engage with the safety module or the base component according to a translational degree of freedom Z, with:
- a first centering component arranged to block two degrees of freedom in translation X and Y,
- a second centering component arranged to block a single degree of freedom in translation Y.

13. The vehicle steering wheel according to claim 1, wherein the framework and/or the second decorative component comprises at least one reference point arranged to allow an optical measurement for detecting a reference position before performing the adjustment of the position of the centering component on the base component and/or on the safety module before the fastening of the centering component to the base component and/or on the safety module.

14. The vehicle steering wheel according to claim 1, wherein the centering component comprises a portion such as a shoulder, arranged to be passed through by a laser beam during the laser welding, and wherein said portion has a thickness in a range from 1 mm to 6 mm.

15. The vehicle steering wheel according to claim 14, wherein said portion has a thickness in a range from 2 mm to 4 mm.

16. A method for manufacturing a vehicle steering wheel according to claim 1, comprising an operation of laser welding the centering component onto the base component after the adjustment of the position of the centering component on the base component and/or on the safety module.

17. The manufacturing method according to claim 16, comprising a step of positioning the centering component in a welding tool, and wherein the laser welding operation comprises a bypass or a step of bypassing at least part of the welding tool.

18. The manufacturing method according to claim 16, comprising the steps of:
- placing the centering component seated on the base component and/or on the safety module,
- passing a laser beam over the zone to be welded, and
- depressing the centering component toward or into the base component and/or towards or into the safety module to force a displacement of at least 0.1 mm.

19. The manufacturing method according to claim 18, wherein the step of depressing the centering component toward or into the base component and/or towards or into the safety module forces a displacement of at least 0.2 mm.

* * * * *